US008661647B2

(12) United States Patent
Chang

(10) Patent No.: US 8,661,647 B2
(45) Date of Patent: Mar. 4, 2014

(54) MANUFACTURING METHOD OF MOUNTING APPARATUS FOR DATA STORAGE DEVICE

(75) Inventor: Chin-Ming Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 233 days.

(21) Appl. No.: 12/871,839

(22) Filed: Aug. 30, 2010

(65) Prior Publication Data

US 2011/0316399 A1 Dec. 29, 2011

(30) Foreign Application Priority Data

Jun. 29, 2010 (CN) .......................... 2010 1 0212389

(51) Int. Cl.
*B23P 11/00* (2006.01)

(52) U.S. Cl.
USPC ............................................... 29/432; 29/438

(58) Field of Classification Search
USPC ........... 29/438, 428, 432, 412, 413, 414, 415, 29/416; 312/223.1, 223.2, 257.1, 265.5; 361/679.31, 679.32, 679.33, 679.34, 361/679.35, 679.36, 679.37, 679.38, 361/679.39, 724, 725, 726, 727; 248/200, 248/205.1, 235, 300; 174/666; 23/438
See application file for complete search history.

(56) References Cited

U.S. PATENT DOCUMENTS

| | | | | |
|---|---|---|---|---|
| 1,909,136 | A * | 5/1933 | Thomas, Jr. | 220/3.94 |
| 2,527,478 | A * | 10/1950 | Gray | 206/168 |
| 2,638,643 | A * | 5/1953 | Olson | 428/577 |
| 3,758,152 | A * | 9/1973 | Lake | 297/158.3 |
| 4,533,060 | A * | 8/1985 | Medlin | 220/3.9 |
| 4,825,339 | A * | 4/1989 | Boudon et al. | 361/724 |
| 4,989,696 | A * | 2/1991 | Buell | 188/218 XL |
| 5,381,891 | A * | 1/1995 | Harris | 206/197 |
| 2007/0194188 | A1 * | 8/2007 | Johnson | 248/218.4 |
| 2010/0193241 | A1 * | 8/2010 | Bennett et al. | 174/666 |

* cited by examiner

*Primary Examiner* — Darnell Jayne
*Assistant Examiner* — Sasha T Varghese
(74) *Attorney, Agent, or Firm* — Altis Law Group, Inc.

(57) ABSTRACT

A mounting apparatus for mounting a data storage device to a chassis includes a main body and two reinforcing members. The main body includes a top surface, a sidewall depending from the top surface, and a supporting wall extending upward from the top surface. Each of the two reinforcing members includes a reinforcing plate, a first fixing plate extending from an edge of the reinforcing member, and a second fixing plate extending from another edge of the reinforcing member. The first fixing plate is fixed on the supporting wall. The second fixing plate is fixed on the top surface.

8 Claims, 3 Drawing Sheets

MANUFACTURING METHOD OF MOUNTING APPARATUS FOR DATA STORAGE DEVICE

BACKGROUND

1. Technical Field

The present disclosure relates to device mounting and, particularly, to a mounting apparatus for mounting a data storage device to a chassis of an electronic device and a manufacturing method of the mounting apparatus.

2. Description of Related Art

Often, a bracket is mounted in a computer enclosure, to which a plurality of data storage devices will be attached. In a conventional bracket, an entirety of the main body and reinforcing members are punched in different processes, which is time consuming and costly.

Therefore, a mounting apparatus and a manufacturing method thereof are desired to overcome the limitations described.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present apparatus and a manufacturing method thereof. Moreover, in the drawings, like reference numerals designate corresponding parts throughout the several views.

DETAILED DESCRIPTION

Figure 1:
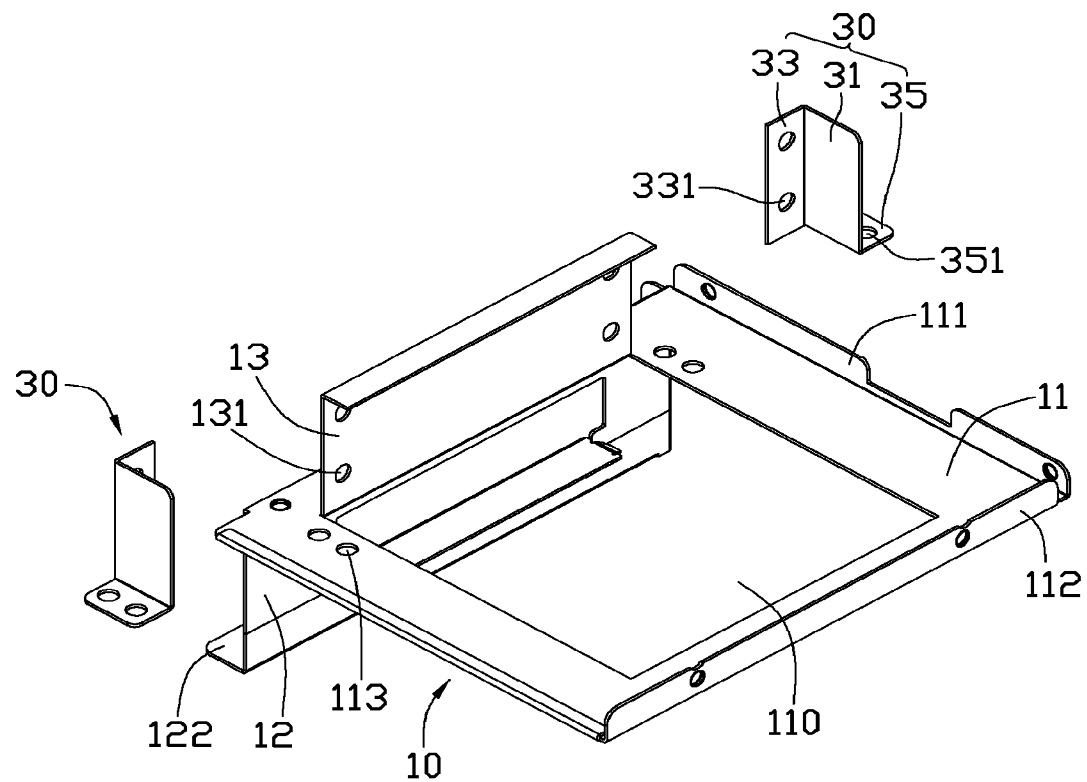
FIG. 1 is an exploded, isometric view of a mounting apparatus according to an exemplary embodiment.
Figure 2:
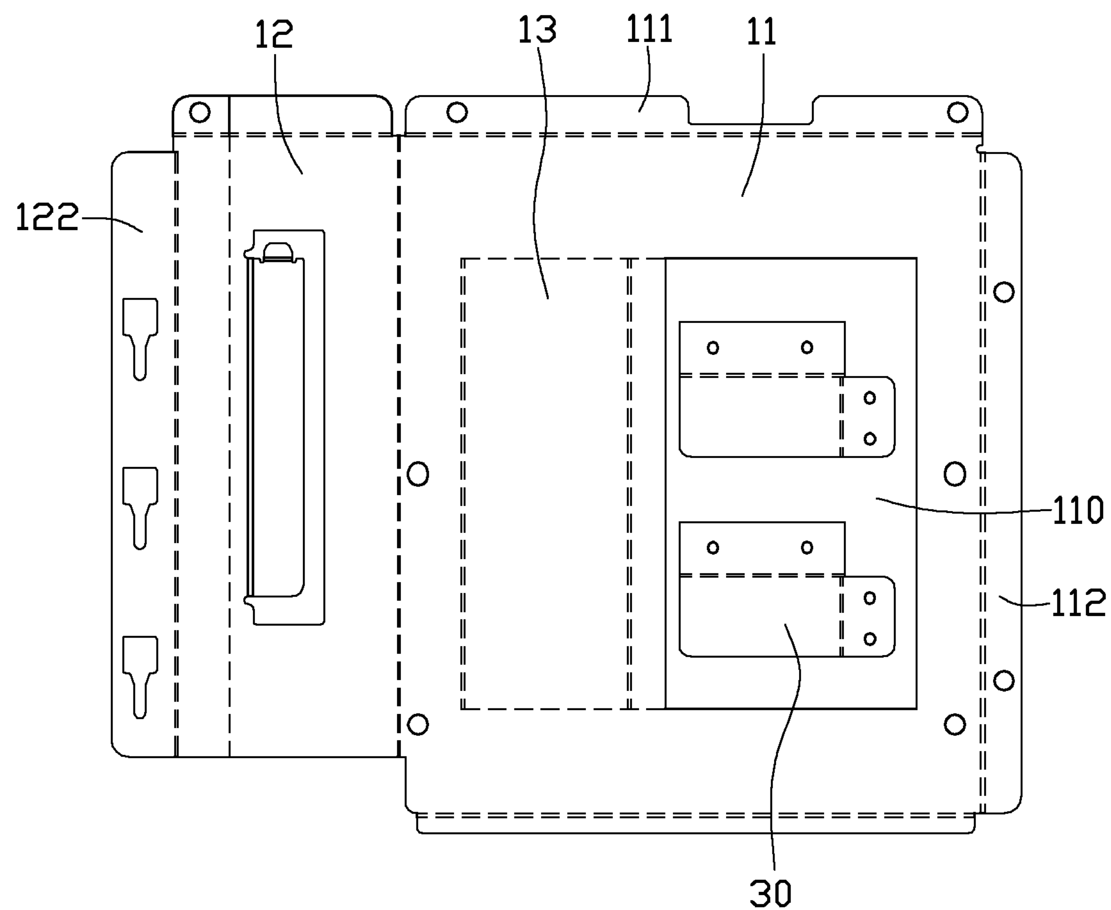
FIG. 2 is a stretch-out view of FIG. 1.
Figure 3:
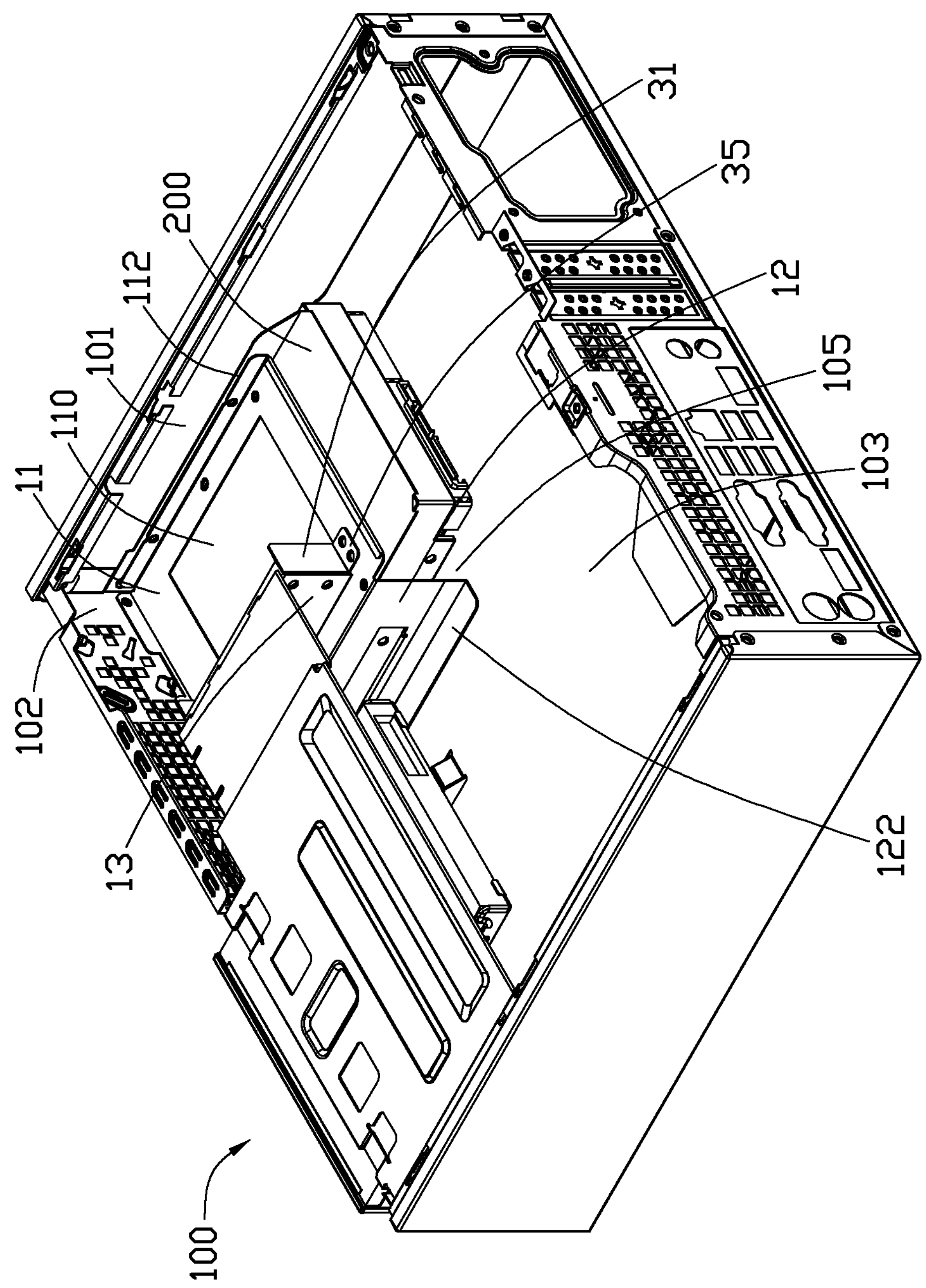
FIG. 3 is an assembled, isometric view of a chassis with the mounting apparatus of FIG. 1 installed therein.

Referring to FIGS. 1-3, a mounting apparatus according to an exemplary embodiment for mounting a data storage device 200 to a chassis 100 is shown. The mounting apparatus includes a main body 10, and two reinforcing members 30.

The main body 10 is integrally formed. The main body 10 includes a top surface 11, a sidewall 12, and a supporting wall 13. The top surface 11 defines a through hole 110 thereon. The sidewall 12 extends downward from a front edge of the top surface 11. The supporting wall 13 extends upward from a front edge of the through hole 110 of the top surface 11. The top surface 11 includes a first fixing portion 111 extending upward from a right edge of the top surface 11, and a second fixing portion 112 extending upward from a rear edge of the top surface 11. The sidewall 12 includes a third fixing portion 122 extending frontward from an edge of the sidewall 12. The supporting wall 13 defines four retaining holes 131 in two ends thereof respectively. The top surface 11 defines four retaining holes 113 near the two ends of the supporting wall 13 respectively.

Each of the two reinforcing members 30 includes a reinforcing plate 31, a first fixing plate 33 extending rightward from an edge of each of the two reinforcing members 30, and a second fixing plate 35 extending leftward from an edge of each of the two reinforcing members 30. The first fixing plate 33 defines two retaining holes 331 therein. The second fixing plate 35 defines two retaining holes 351 therein.

A manufacturing method of the mounting apparatus follows.

In step S1, sheet metal is punched to form blanks of the main body 10 and the two reinforcing members 30. The through hole 110 is partially cut out in the blanks of the main body 10, and the blanks of the two reinforcing members 30 are punched from a remainder from the blanks of the main body 10. The blanks of the main body 10 are cut to form the through hole 110 and the remainder from the blanks of the main body 10 punched to form blanks of the two reinforcing members 30, completed in the same process.

In step S2, blanks of the main body 10 and the two reinforcing members 30 are bent to form the main body 10 and the reinforcing members 30.

In step S3, the two reinforcing members 30 are fixed between the top surface 11 and the supporting wall 13 of the main body 10.

In assembly of the two reinforcing members 30 to the main body 10, the two reinforcing plates 31 of the two reinforcing members 30 abut the two ends of the supporting wall 13 respectively. The two first fixing plates 33 of the two reinforcing members 30 abut the supporting wall 13, and the two retaining holes 331 of each of the two first fixing plates 33 are aligned with the retaining holes 131 of the supporting wall 13. The two second fixing plates 35 of the two reinforcing members 30 abut the top surface 11, and the two retaining holes 351 of each of the two second fixing plates 35 are aligned with the retaining holes 113 of the top surface 11. A plurality of fixing members pass through the retaining holes 331 and the retaining holes 131, and the other plurality of fixing members pass through the retaining holes 351 and the retaining holes 113. Accordingly, the two reinforcing members 30 are fixed between the top surface 11 and the supporting wall 13 to enhance structural integrity of the main body 10.

In assembly of the mounting apparatus to the chassis 100, the first fixing portion 111 is fixed on an end plate 102 of the chassis 100, the second fixing portion 112 is fixed on a side plate 101 of the chassis 100, and the third fixing portion 122 is fixed on a bottom plate 103 of the chassis 100. The top surface 11 of the main body 10, the sidewall 12 of the main body 10, the end plate 102 of the chassis 100, and the side plate 101 of the chassis 100 cooperatively define a receiving space 105 for receiving the data storage device 200 therein.

While the invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of manufacturing a mounting apparatus comprising:

punching sheet metal to form blanks of a main body and two reinforcing members, wherein a through hole is partially cut out in the blank of the main body, and the blanks of the two reinforcing members are punched from a remainder of the blank of the main body;

separating the blanks of the two reinforcing members from the blank of the main body;

bending the blanks of the main body and the two reinforcing members to form the main body having a top surface and a supporting wall extending upward from the top surface, and the reinforcing members, respectively; and fixing each of the two reinforcing members on the top surface and the supporting wall of the main body;

wherein the main body comprises a sidewall extending downward from the top surface; and wherein each of the two reinforcing members comprises a reinforcing plate, a first fixing plate extending from an edge of the reinforcing member, and a second fixing plate extending from another edge of the reinforcing member, wherein the first fixing plate is fixed on the supporting wall, and wherein the second fixing plate is fixed on the top surface.

2. The method of claim 1, wherein the two reinforcing members are fixed between the top surface and the supporting wall of the main body.

3. The method of claim 1, wherein the top surface includes a first retaining hole, the supporting wall includes a second retaining hole, the first fixing plate includes a third retaining hole, and the second fixing plate includes a fourth retaining hole.

4. The method of claim 3, wherein a first fixing member passes through the first retaining hole of the top surface and the fourth retaining hole of the second fixing plate, and a second fixing member passes through the second retaining hole of the supporting wall and the third retaining hole of the first fixing plate.

5. The method of claim 1, wherein, in the punching step, the remainder is separated from the blank of the main body to form the through hole, and the blanks of the two reinforcing members are separated from the remainder.

6. The method of claim 1, wherein the two reinforcing members are fixed on the main body by a plurality of fixing members.

7. The method of claim 1, wherein the blanks of the two reinforcing members are separated from the blank of the main body by punching the sheet metal.

8. The method of claim 1, wherein the two reinforcing members are fixed between the top surface and the supporting wall to add support and structural integrity to the supporting wall of the main body.

* * * * *